(12) United States Patent
Bai

(10) Patent No.: US 8,253,975 B2
(45) Date of Patent: Aug. 28, 2012

(54) METHOD AND APPARATUS FOR CALIBRATION OF A COLOR PRINTER

(75) Inventor: Yingjun Bai, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1644 days.

(21) Appl. No.: 11/439,187

(22) Filed: May 24, 2006

(65) Prior Publication Data

US 2007/0273900 A1  Nov. 29, 2007

(51) Int. Cl.
*G06F 15/00* (2006.01)
(52) U.S. Cl. .................................................. 358/1.9
(58) Field of Classification Search .................. 358/1.9
See application file for complete search history.

(56) References Cited

U.S. PATENT DOCUMENTS

| | | | | |
|---|---|---|---|---|
| 5,249,067 A * | 9/1993 | Hirosawa | ........... | 358/3.21 |
| 5,293,258 A * | 3/1994 | Dattilo | ........... | 358/518 |
| 5,604,567 A * | 2/1997 | Dundas et al. | ........... | 399/39 |
| 6,157,469 A * | 12/2000 | Mestha | ........... | 358/504 |
| 6,584,903 B2 * | 7/2003 | Jacobs | ........... | 101/484 |
| 6,900,448 B1 * | 5/2005 | Thompson | ........... | 250/559.1 |
| 7,319,545 B2 * | 1/2008 | Linder et al. | ........... | 358/1.9 |
| 2003/0128378 A1 * | 7/2003 | Cooper et al. | ........... | 358/1.9 |
| 2004/0114164 A1 | 6/2004 | Linder et al. | | |
| 2005/0018219 A1 * | 1/2005 | Senn et al. | ........... | 358/1.8 |

* cited by examiner

*Primary Examiner* — Benny Q Tieu
*Assistant Examiner* — Jeremiah Bryar
(74) *Attorney, Agent, or Firm* — Pillsbury Winthrop Shaw Pittman LLP

(57) ABSTRACT

A color reproduction system with drift correction that includes a storage module, an image processing module, a printer, a scanner, and a calibration module. The storage module stores one or more current linear response halftones and a set of device independent color signals representative of a calibration target. The image processing module receives the stored device independent color signals and generates binary print data based on the one or more current linear response halftones. The printer prints a copy of the calibration target in accordance with the binary print data. The scanner scans the copy of the calibration target printed by the printer to generate scanned image data that corresponds to the copy of the calibration target. The calibration module generates one or more tone response correction functions based on a comparison between the scanned image data and the stored device independent color signals representative of the calibration target, and creates one or more calibrated linear response halftones based on the generated tone response correction functions. In some instances, the one or more calibrated linear response halftones are stored in the storage module as the current linear response halftones.

12 Claims, 5 Drawing Sheets

METHOD AND APPARATUS FOR CALIBRATION OF A COLOR PRINTER

FIELD

This application relates to the field of color reprographic devices, and in particular to ways of maintaining them in a known state.

BACKGROUND

As the number of color printers in common use has increased over the past decade, end users of such devices have become aware of the need to recalibrate these devices. Because of the nature of color reproduction, color printers are more subject to drift than are their black and white counterparts. One cause of such drift is deviation of the underlying components due to age or changes in the environment. For example, a typical color printing device is likely to vary due to changes in the underlying marking process in response to external conditions like temperature and humidity, and internal changes due to aging of the components. These variations from a known, standard state, can result in undesirable variation in the appearance of the output from such reprographic devices. Compounding this problem of drift is the sensitivity of human perception, which, for certain colors, emphasizes even minor shifts or differences in color.

U.S. Patent Application Publication No. 2004/0114164, entitled "Method and Apparatus for Calibration of a Color Printer," and filed Jul. 21, 2003, describes a method permitting an end user to recalibrate a color reproduction device. The method includes printing a test target and scanning it with a scanner that forms a part of the color reproduction device. The device compares the desired values with the values obtained from scanning the printed test target to calibrates the processing of image data to compensate for differences between the desired values and the values obtained from scanning the printed test target. This application is incorporated by reference into the present application in its entirety for all purposes.

SUMMARY

One aspect relates to a color reproduction system with drift correction. In one embodiment, the system comprises a storage module, an image processing module, a printer, a scanner, and a calibration module. The storage module stores a set of device independent color signals representative of a calibration target. The scanner scans a copy of the calibration target printed by a printer to generate scanned image data that corresponds to the copy of the calibration target. The calibration module compares the scanned image data with the stored device independent color signals representative of the calibration target and generates one or more tone response correction functions based on the comparison between the scanned image data and the stored device independent color signals, and creates one or more calibrated halftones for implementation on the printer based on the generated tone response correction functions.

Another aspect relates to a method of maintaining the reproduction properties of a color reprographic device. In one embodiment the method comprises generating scanned image data that corresponds to a copy of a calibration target by scanning the copy of the calibration target, comparing the scanned image data that corresponds to the copy of the calibration target and stored device independent color signals representative of the calibration target, generating one or more tone response correction functions to compensate for nonlinearity in the color reprographic device, wherein the one or more tone response correction functions are generated based on the comparison of the scanned image data that corresponds to the copy of the calibration target and the stored device independent color signals representative of the calibration target, and creating one or more calibrated halftones based on the generated tone response functions.

Other object, features, and advantages of the embodiments described herein will become apparent from the following detailed description, the accompanying drawings, and the appended claims.

BRIEF DESCRIPTION OF THE DRAWINGS

The teachings and embodiments disclosed herein are described in detail with reference to the following drawings, wherein like numerals will refer to like elements, and wherein.

DETAILED DESCRIPTION

Figure 1:
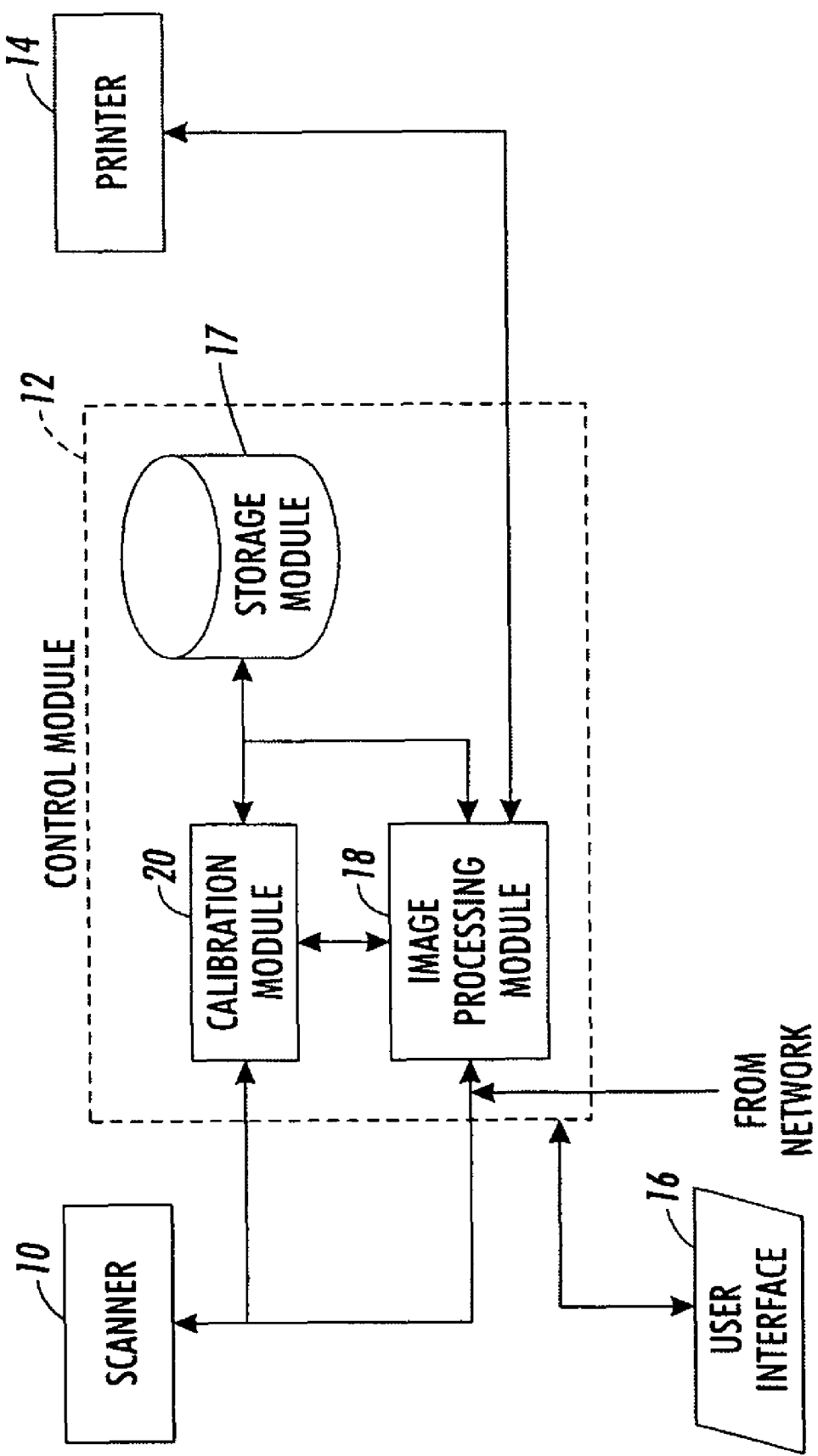
FIG. 1 shows an overview of a color reprographic device which may incorporate one or more aspects of the embodiments disclosed herein.

Referring to FIG. 1, there is shown the major components of a typical color reprographic system which may incorporate one or more aspects of the embodiments disclosed herein. The color reprographic system includes an input scanner 10, a control module 12, an output printer 14, and a user interface 16 to allow the users of the device to enter control information (e.g., the number of copies to be made). The control module 12 contains a storage module 17, an image processing module 18, and a calibration module 20.

When the device is used as for copying hardcopy originals, the original to be copied is placed on the scanner and a command is given from the user interface 16, to initiate the copying process. Scanner 10 scans the original to generate an electronic image of the page to be reproduced. Image processing module 18 accepts the electronic image from the scanner 10 (or some other source) and applies the appropriate processing to convert the image to a form suitable for printing. The processing includes conversion from the color space of the scanner 10, usually some form of RGB coding (e.g., RGB contone data), to the color space required by the printer 14, here assumed to be some form of CMYK although alternate color spaces can be employed, and converts the color space information to binary data that enables the printer 14 to output a copy of the electronic image. Additional operations performed by image processing module 18 could include enlargement or reduction of the image size, rotation of the image, modifications to the color balance, and any others that are chosen by the user through manipulation of the user interface 16. It should be appreciated that image processing module 18 may accept electronic images from sources other than the scanner 10. For instance, module 18 may accept images generated by a user, images stored to a storage medium or other images.

Figure 2:
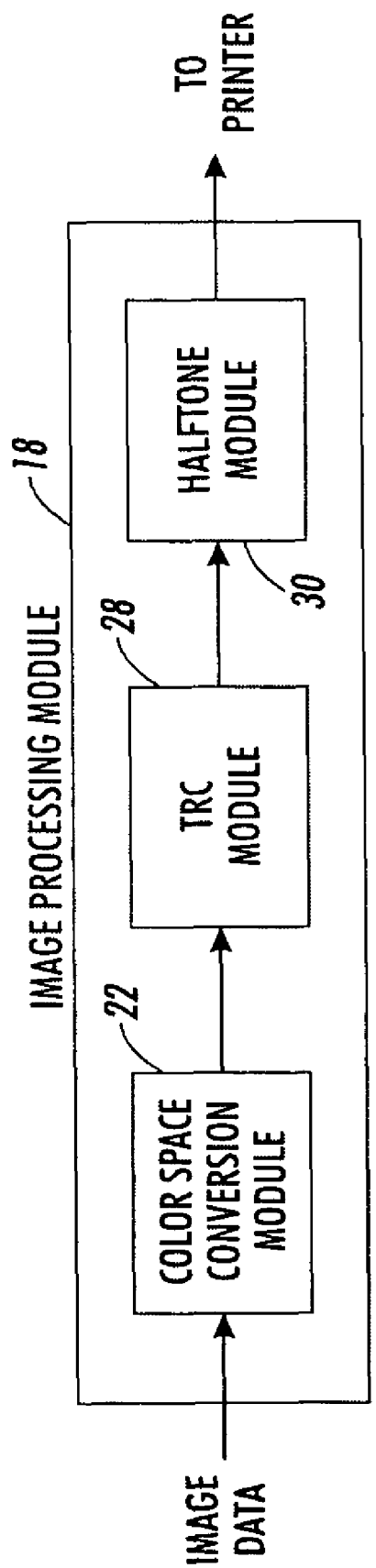
FIG. 2 shows the image processing components in a conventional control module, according to one embodiment.

Referring to FIG. 2, there is shown a schematic of the typical elements included in the image processing module 18, according to one or more embodiments. This example is not intended to be limiting. As shown in FIG. 2, image processing module 18 includes a color space conversion module 22 to convert image data (e.g., contone data) from a first color space, such as an RGB color space, to a second color space required by the output printer 14, such as a CMYK color space. The image processing module 18 includes a Tone Response Correction ("TRC") module 28 to compensate for nonlinearity in the printer 14, and a halftone module 30 to halftone the data to generate binary data for the output printer 14 in accordance with a stored (e.g., in storage module 17) linear response halftone. Nonlinearity in the printer 14 may be a symptom of one or more of mechanical wear-and-tear, ink supply levels, ink composition, and/or other sources of nonlinearity in the printer 14. It should be understood that the depiction of modules 22, 28, and 30 is provided for illustrative purposes. For example, in some embodiments, some of modules 22, 28, and 30 may not be implemented, and/or other modules not shown in FIG. 2 may be included. When the reprographic device is operating properly, the output copy will be a reproduction of an image that corresponds precisely with an image designated and/or designed by the user. For example, in instances in which the reprographic device is used for copying, the output copy may include a faithful copy of the original.

In one embodiment, after image data (e.g., image data from the scanner 20) are converted to the CMYK values by color space conversion module 22, the CMYK values are processed through a TRC function by the TRC module 28 to correct for a nonlinear response of the output printer 14. Generally, image processing module 18 is implemented such that the conversion from RGB to CMYK assumes that equal CMY values will produce neutral colors on the output printer 14. While most color printer devices do not actually behave in such a fashion, the TRC function can be used to compensate for the gray imbalance as well as the nonlinearity of the output printer 14. It has been found that many of the drifts in the output printer 14 that produce customer concern involve shifts in the relative balance of the CMY colorants that produce a gray imbalance. As will be discussed further below, the TRC function may be generated to compensate for drift of the output printer 14.

The teachings herein are directed to aspects of a reprographic system such as the device shown in FIG. 1. In particular, the teachings herein employ the scanner 10 associated with a color reproduction device as the color measurement apparatus. Modern scanners presently available have achieved a level of performance where the design and associated process controls in the scanner make the scanner a relatively stable device. Certainly for most purposes the drift associated with the scanner is much less than that associated with the output printer 14.

In order to implement a recalibration procedure, a calibration target is developed. The calibration target may contain a number of color patches, spread across the color space of the output printer 14. Printing the calibration target with a device provides an indication of the state of the device and/or any associated drift therein. In one embodiment, step wedges are included in the CMYK colorants, both solid primary and secondary (pairs of CMYK) colors, and have a large number of nearly neutral patches around the $a^*=b^*=0$ axis. The calibration target design may also include a design of the layout of the patches that has extra marks or patches to help identify the orientation of the calibration target and thus, provided information as to the identity of particular patches. Further considerations may include randomization of the patches such that there is no particular dependence of one of the output colorants in either the horizontal or vertical direction. After the patches are defined in terms of their color and layout, the target design is implemented in some page description language (PDL) or other format that can be stored as part of the permanent memory of the image processing module 18. This will enable the image processing module 18 to print the target during the customer operation of the calibration process. As another step during the design of the calibration target, the desired values for each patch in a device independent color space is determined, either by measurement or by some combination of measurement and modeling. Any device independent color space may be implemented. For example, HSV, CIE XYZ, and CIE L*a*b* systems can be used as the device independent color space. It has been found that using the CIE L*a*b* system gives adequate results, and thus, the embodiments herein will be described using this space. These desired L*a*b* values are then stored in the storage module 17, as desired aim values representing the calibration target along with the instructions for printing the calibration target.

Figure 3:
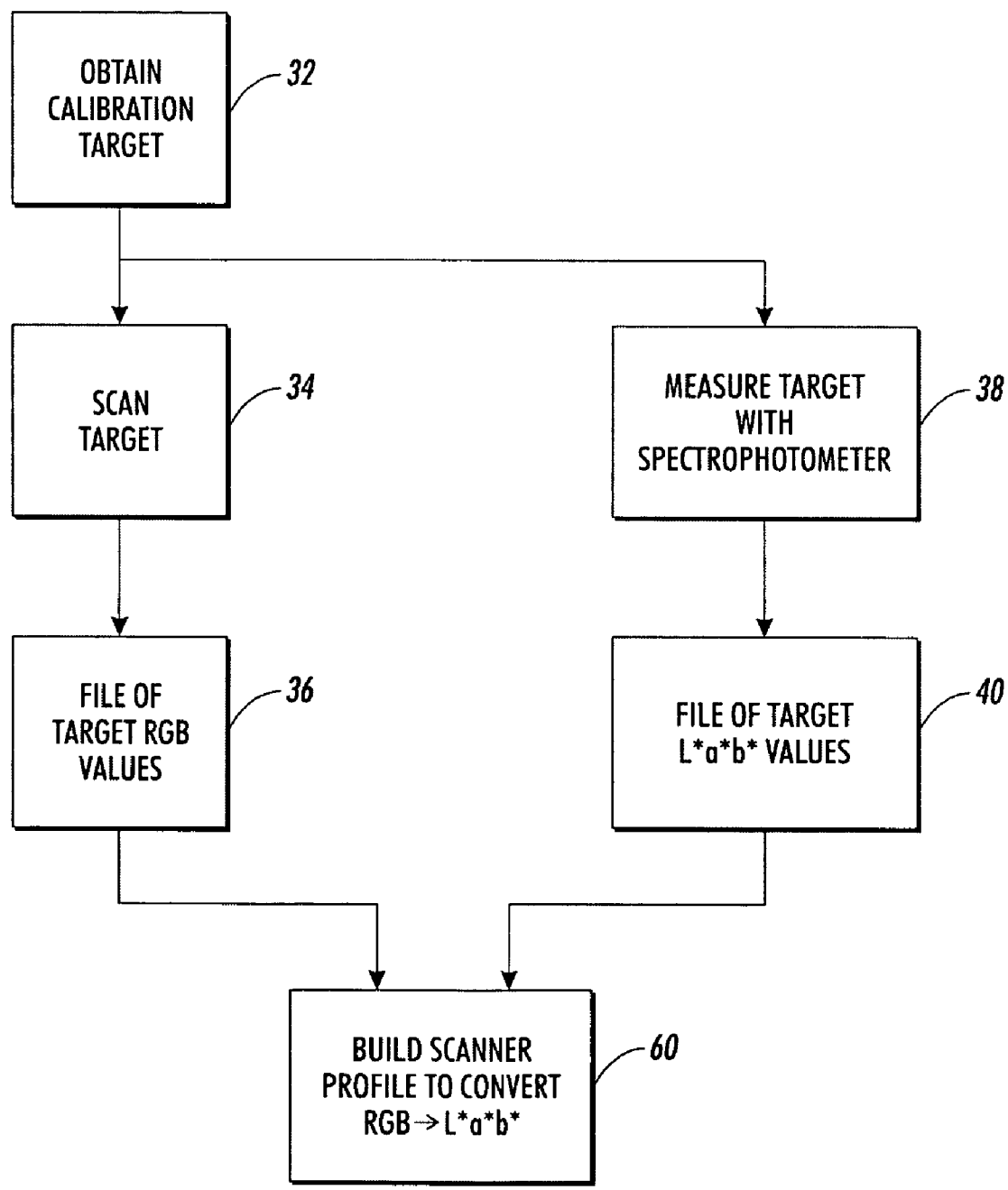
FIG. 3 illustrates a method that may be used to generate a scanner profile, according to one embodiment.

FIG. 3 shows a method that may be implemented to prepare the data elements for the current disclosure, in accordance with one or more embodiments. First a calibration target of some form is obtained (step 32). The calibration target should contain a plurality of color patches representative of a range of colors. In some instances, the color patches include patches that are neutral or near neutral in color. The color patches may take the form of single step wedges. The calibration target is scanned using a scanner representative of a scanning device to be manufactured (step 34). Either a carefully controlled model of the scanner may be used, or alternatively, several samples may be used and the results averaged. Similarly, the calibration target may be scanned with multiple "representative" scanning devices and the results obtained therefrom may be averaged. The output of this scan is a set of RGB values (e.g., contone data) for each patch in the calibration target. This set of set of RGB values is stored as target RGB values for the representative scanning device (step 36). In addition to the scanning values, a separate set of measurements is made, using a colorimeter to obtain L*a*b* values for each patch in the calibration target (step 38). The set of L*a*b* values for each patch in the target is compiled as a file of measured L*a*b* values (step 40). These two data sets, the RGB values, and the L*a*b* values are then combined to generate a scanner profile, which can be used to convert RGB values to L*a*b* (step 42). The details of the scanner profile will depend on the particular method chosen to perform the conversion, ICC profile, 3D LUT or some other method. However, the generation of a scanner profile is well known to those skilled in the art.

Figure 4:
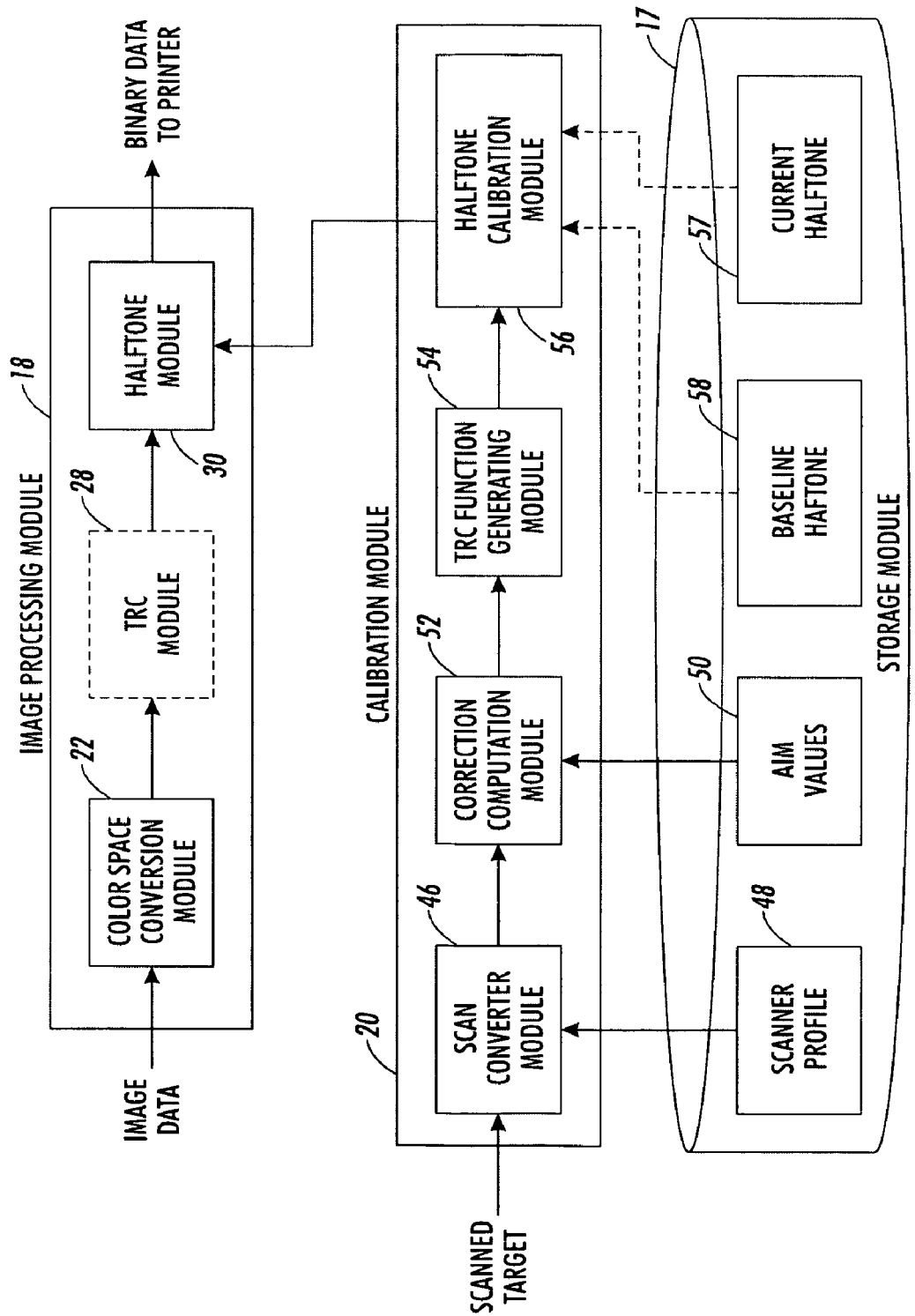
FIG. 4 shows the image processing components in the control module of a color reprographic device, in accordance with one or more embodiments.

Referring now to FIG. 4, there is shown an embodiment of calibration module 20 that enables modification of image processing module 18 to calibrate the color reprographic system. As shown in FIG. 4, scanned RGB image data (e.g., contone data) obtained from scanning a copy of the calibration target generated by the printer 14 is supplied to a scan converter module 46, which in response to a scanner profile 48, generates L*a*b* values for each patch in the target. These L*a*b* values are compared to, or combined with, desired aim values 50 (stored in storage module 17) in a correction computation module 52, to generate printer corrections. The specific printer corrections may be generated by a TRC function generation module 54 and a linear response halftone calibration module 56, which references a stored baseline linear response halftone 58. These can be fed back to an appropriate one of modules, 22, 28, and 30 as chosen.

More particularly, calibration module 20 includes scan converter module 46, that performs a conversion between the device dependent color space of the scanner 10, here assumed to be an RGB contone color space, and the device independent color space. It should be appreciated that scan converter module 46 can be implemented in software, firmware, hardware or any combination thereof.

The conversion of image data from the scanner space into the device independent space can be done using several different algorithms. For example, one can implement a transformation using the International Color Consortium (ICC) profile method. This algorithm, which is described in documents available from the ICC on their website at http://www.color.org, describes a method and file format for implementing a conversion from a device dependent RGB space into a device independent space. Alternatively, one may use well-known algorithms to develop a multidimensional look up table (LUT) that accepts the RGB values as input and has the corresponding device independent values as table entries. Such a table may be combined with interpolation methods to allow the table to be smaller than say 256×256×256 nodes. Algorithms for developing such transformations are well known to those who develop color reproduction devices and will not be described in further detail.

The scan converter module 46 and the scanner profile 48 can be considered to comprise a calibration conversion processor for converting the scanned image data into a set of device independent color signals. When scanner profile 48 is implemented as a LUT, the converter module 46 operates to convert the scanned RGB data for the scanned test target using the LUT 48. Alternatively, scanner profile 48 is implemented as an ICC profile, the converter module 46 operates to convert the scanned RGB data using the information in the stored ICC profile 48 in accordance with ICC conversion procedures. In one embodiment, the scanner profile 48 is stored in the storage module 17.

The device independent color signals from the converter module 46 (here considered to be L*a*b* values) are passed to the correction computation module 52, wherein the L*a*b* values are compared with the aim values 50 to generate printer corrections. The printer corrections may include a set of color shift correction signals that correspond to the differences between the L*a*b* values and aim values 50. In this manner, the correction computation module 52 and the desired aim values 50 can be considered to comprise a correction determination processor which generates the set of color shift correction signals that can compensate for any shifts in the color reproduction properties of the output printer unit by comparing the device independent color signals representative of a printed version of said calibration target with the desired aim values.

In one embodiment, the set of color shift correction signals may be implemented by TRC function generation module 54 to generate one or more new TRC functions. The generated TRC function(s) may correct for a nonlinear response of the printer unit 10 (e.g., nonlinear response due to equipment wear, ink supply changes, etc.) reflected in the set of color shift correction signals.

The generated TRC function(s) are then passed from TRC function generation module 54 to linear response halftone calibration module 56. The linear response halftone calibration module 56 receives the TRC function(s) and uses them to calibrate the baseline linear response halftone 58 to determine a calibrated linear response halftone. As is shown in FIG. 4, the calibrated linear response halftone is then provided to halftone module 30, which uses the calibrated linear response halftone to halftone images for output on output printer 14. The halftone module 30 will use the calibrated linear response halftone until the reprographic system is calibrated again and a new calibrated linear response halftone is determined. At that time, the new calibrated linear response halftone will be implemented by the halftone module 30.

In one embodiment, the determination of the calibrated linear response halftone by the linear response halftone calibration module 56 includes calibrating a current linear response halftone 57 that is currently being used by halftone module 30 to halftone image data based on the generated TRC function. The current linear response halftone 57 may be stored in storage module 17 or it may reside in the halftone module 30 itself. This current linear response halftone would be replaced by the calibrated function upon each calibration. Thus, this one embodiment is making the calibration based on the halftone used to output the calibration target. In another embodiment, the determination of the calibrated halftone includes calibrating a baseline linear response halftone 58 based on the generated TRC function. The baseline linear response halftone 58 is a baseline linear response halftone that corresponds to output printer 14, and would typically be used by halftone module 30 in embodiments where the TRC function are applied within image processing module 18 by a module (e.g., TRC module 28) separate from halftone module 30. In other words, baseline linear response halftone 58 would be the proper linear response halftone if the aim values 50 substantially matched the device independent color signals generated by scan converter module 46, indicating that the printer 14 was experiencing virtually no nonlinearity.

The calibration of a linear response halftone based on the generated TRC function effectively enables the application of the TRC function to correct for nonlinearity in the printer 14 and the halftoning of the image data to be executed by a single module (e.g., halftone module 30) in a single step within image processing module 18. This may increase the speed of image processing module 18 in rendering images for output on output printer 14 (by virtue of reducing the amount of processing required). The application of the calibrated linear response halftone(s) that essentially include the corrections embodied in the TRC function also leaves a "space" in image processing module 18 for other changes to be made to the image data at TRC module 28. For example, some documents that are transmitted to image processing module 18 for output to output printer 14 may have their own TRC function. In embodiments in which there is already a TRC function being implemented by TRC module 28 (e.g., a TRC function generated by TRC function generation module 54), a TRC function included in the document may be ignored in favor of the TRC function already being implemented by TRC module 28. This may introduce various artifacts in the copy of the document produced by output printer 14. For example, one or more portions of the copy may be to dark, to light, be shaded inaccurately, or include other artifacts.

Figure 5:
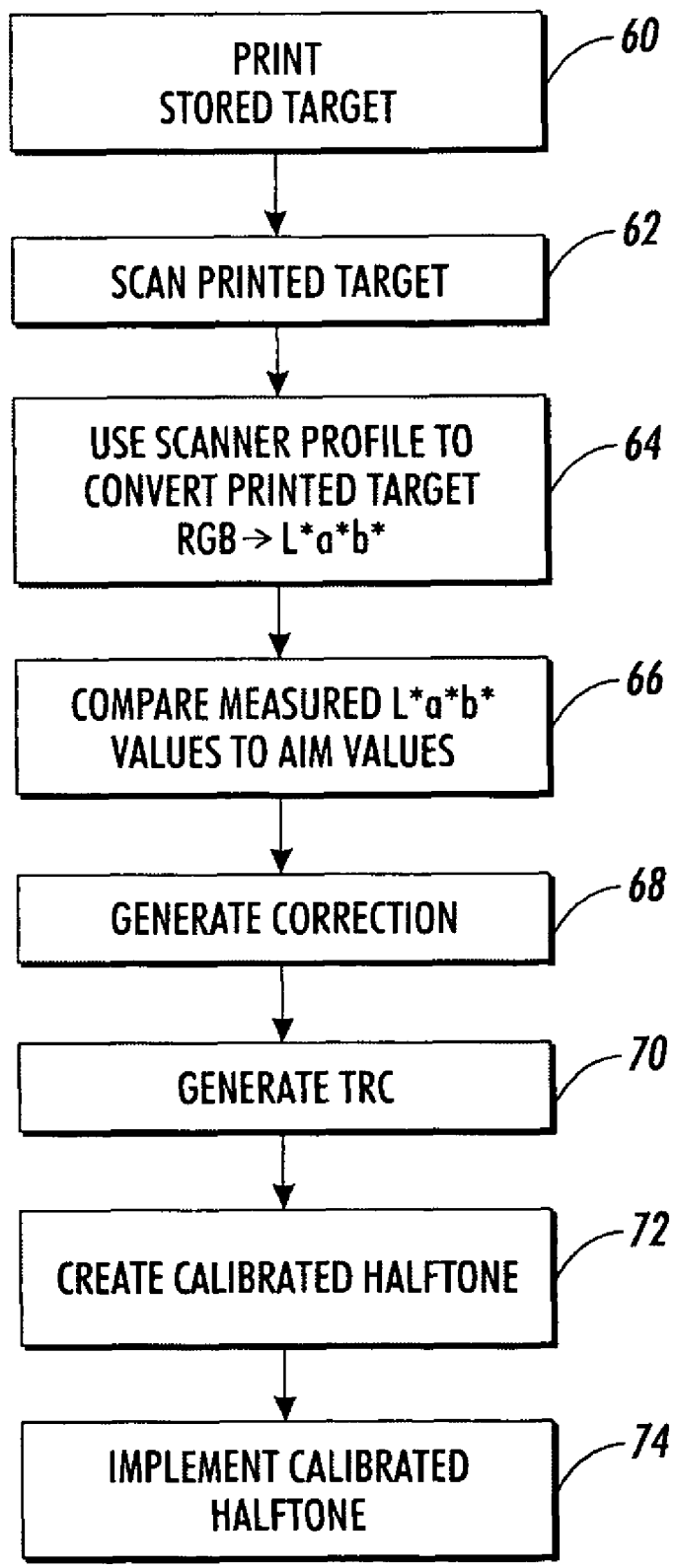
FIG. 5 illustrates a method that may be used to calibrate a color reprographic device, in accordance with one embodiment.

The steps in the process to be described are shown in FIG. 5. To execute the recalibration process the customer, through the user interface 16, requests that the calibration target stored in storage module 17 be printed (step 60). The customer then takes the output sheet or sheets, places them in the input to the scanner, and, again through the user interface 16, causes them to be scanned (step 62). As each sheet is scanned the image is temporarily stored in the image processing module 18. Image processing module 18 then analyzes each patch, taking an average over all or a portion of each patch to get an average RGB value for each patch in the target. During the analysis, image processing module 18 may also check the page image to determine the orientation of the page in the scanner. If such functionality is included, it will allow the user to place the page or pages in the scanner in any orientation without compromising the quality of the recalibration. As each patch's RGB values are determined, the calibration conversion processor (the scanner converter module 46 and the scanner profile 48) employing a LUT, ICC profile conversion or other transform method implemented during the design of the color reproduction device is invoked to derive an L*a*b* value for each patch (step 64).

By comparing (step 66) the L*a*b* values measured by the scanner-transform combination 46, 48 with the aim values 50 stored in the image processing module, a set of corrections may be derived that can compensate for any shifts in the color reproduction properties of the output printer 14 (step 68). These corrections are then used to generate a TRC function by TRC function generation module 54 (step 70). The linear response halftone calibration module 56 then creates a calibrated linear response halftone by folding the generated TRC function into the baseline linear response halftone 58 (step 72). The calibrated linear response halftone may then be provided to halftone module 30 for implementation in rendering image data for output in image processing module 18 (step 74).

While the previous description has been focused on using a scanner that is part of a color reproduction device, it is not necessary to confine the implementation to such a device. Indeed, any suitably calibrated scanner can be used as the substitute color measuring device. For example a separate scanner could be used that is connected to a network to enable such a scanner to be used to calibrate many color reprographic devices.

While the subject matter of this application has been described in conjunction with the specific embodiments outlined above, it is evident that many alternatives, modifications and variations will be apparent to those skilled in the art. Accordingly, the preferred embodiments as set forth above are intended to be illustrative, not limiting. Various changes may be made without departing from the spirit and scope of the invention as defined in the following claims.

What is claimed is:

1. A color reproduction system with drift correction, comprising:
    a storage module that stores a set of device independent color signals representative of a calibration target;
    a scanner that scans a copy of the calibration target printed by a printer to generate scanned image data that corresponds to the copy of the calibration target;
    a scan conversion module that converts the scanned image data to device independent color signals that represent the printed copy of the calibration target;
    a calibration module that compares the scanned image data with the stored device independent color signals representative of the calibration target and generates one or more tone response correction functions based on the comparison between the scanned image data and the stored device independent color signals, and creates one or more calibrated halftones for implementation on the printer based on the generated tone response correction functions, wherein the one or more calibrated halftones are adapted to convert image data to binary print data readable by the printer;
    a correction computation module that generates a set of color shift correction signals by comparing the stored device independent color signals representative of the calibration target with the device independent color signals representative of the printed copy of the calibration target;
    a tone response correction function generating module that generates the tone response correction function based on the set of color shift correction signals; and
    a linear response halftone calibration module that creates the one or more calibrated halftones by adjusting one or more stored halftones based on the baseline tone response correction function.

2. The system of claim 1, further comprising:
    an image processing module that receives the stored device independent color signals and generates binary print data based on one or more current halftones, the one or more current halftones being stored by the storage module; and
    the printer, wherein the printer prints the copy of the calibration target in accordance with the binary print data;
    wherein the one or more calibrated halftones are stored by the storage module after the one or more calibrated halftones are created by the calibration module; and
    wherein the image processing module implements the calibrated one or more halftones on the printer by using the one or more calibrated halftones in subsequent operations to generate binary print data.

3. The system of claim 1, wherein the calibration target has a plurality of patches that are neutral or near neutral in color.

4. The system of claim 1, wherein the scanner is separate from one or more of the other enumerated features of the system and is connected thereto by a network.

5. The system of claim 1, wherein when the calibrated halftones are stored in the storage module, the calibrated halftones replace the stored halftones implemented by the image processing module in the storage module.

6. The system of claim 1, further comprising:
    an image processing module that receives the stored device independent color signals and generates binary print data based on one or more baseline halftones, the one or more baseline halftones being stored by the storage module; and
    the printer, wherein the printer prints the copy of the calibration target in accordance with the binary print data;
    wherein the one or more calibrated halftones are stored by the storage module; and
    wherein the image processing module implements the calibrated one or more halftones on the printer by using the one or more calibrated halftones in subsequent operations to generate binary print data.

7. The system of claim 6, wherein the calibration module creates the one or more calibrated halftones by applying adjustments to one or more current halftones that correspond to the one or more generated tone response correction functions, and wherein the one or more current halftones are stored separately from the one or more baseline halftones.

8. The system of claim 6, wherein the calibration module creates the one or more calibrated halftones by applying adjustments to the one or more baseline halftones that correspond to the one or more generated tone response functions.

9. A color reproduction system with drift correction, comprising:
    a storage module that stores a set of device independent color signals representative of a calibration target;
    a scanner that scans a copy of the calibration target printed by a printer to generate scanned image data that corresponds to the copy of the calibration target;
    an image processing module that receives the stored device independent color signals and generates binary print data based on one or more current halftones, the one or more current halftones being stored by the storage module; and a printer, wherein the printer prints the copy of the calibration target in accordance with the binary print data;

a calibration module that compares the scanned image data with the stored device independent color signals representative of the calibration target and generates one or more tone response correction functions based on the comparison between the scanned image data and the stored device independent color signals, and creates one or more calibrated halftones for implementation on the printer based on the generated tone response correction functions, wherein the one or more calibrated halftones are adapted to convert image data to binary print data readable by the printer;

wherein the one or more calibrated halftones are stored by the storage module after the one or more calibrated halftones are created by the calibration module;

wherein the calibration module creates the one or more calibrated halftones by applying adjustments to the one or more current halftones that correspond to the one or more generated tone response correction functions; and wherein the image processing module implements the calibrated one or more halftones on the printer by using the one or more calibrated halftones in subsequent operations to generate binary print data.

10. The system of claim 9, wherein the image processing module comprises:

a color space conversion module that converts the stored device independent color signals into image data in a color space associated with the color reproduction system; and a halftone module that halftones the image data to generate the binary print data, wherein the halftone module halftones the image data according to the one or more stored halftones.

11. The system of claim 9, wherein the calibrated linear response halftone maintains the overall gray balance of the printer.

12. The system of claim 9, wherein the calibration module creates the calibrated halftones by applying adjustments to one or more baseline halftones that correspond to the one or more generated tone response functions, and wherein the one or more baseline halftones are stored separately from the one or more current halftones.

* * * * *